W. A. WHARTON.
FELLY.

No. 189,162. Patented April 3, 1877.

WITNESSES:
H. Rydquist

INVENTOR:
W. A. Wharton

UNITED STATES PATENT OFFICE.

WILLIAM A. WHARTON, OF BELLE CENTRE, OHIO, ASSIGNOR TO HIMSELF AND H. E. LAMBERT, OF SAME PLACE.

IMPROVEMENT IN FELLIES.

Specification forming part of Letters Patent No. 189,162, dated April 3, 1877; application filed January 29, 1877.

*To all whom it may concern:*

Figure 1:
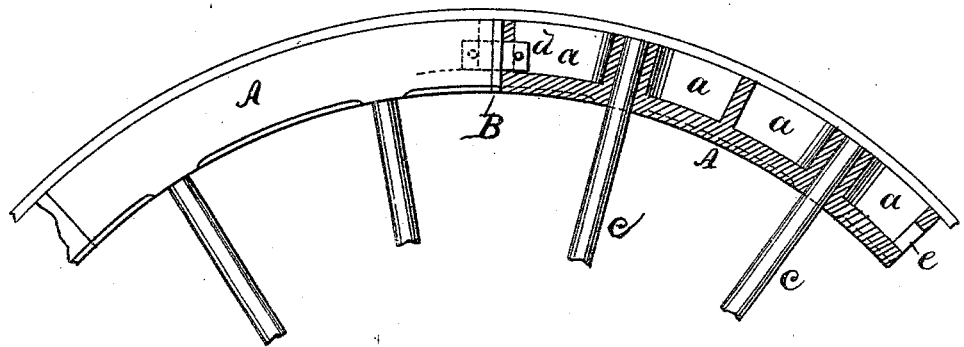
Figure 2:
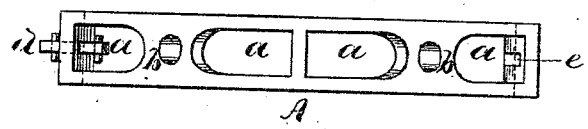
Figure 3:
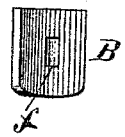

Be it known that I, WILLIAM A. WHARTON, of Belle Centre, in the county of Logan and State of Ohio, have invented a new and Improved Felly, of which the following is a specification:

Figure 1 is a side elevation of a portion of a wheel, showing one of the fellies in central longitudinal section. Fig. 2 is a view of the peripheral side of the felly-section. Fig. 3 is a detail view of the blocking used between the ends of the felly-sections.

Similar letters of reference indicate corresponding parts.

The invention will first be described in connection with the drawing, and then pointed out in the claim.

In the drawing, A is a section of felly, which is made from malleable iron, or any other suitable metal, so as to present the same exterior form and appearance as the ordinary wooden felly; but from its peripheral or tire side it is chambered out at $a\ a$, to lighten and cheapen it. Holes $b\ b$ are made in it to receive the spokes $c\ c$, and from one of its ends the dowel $d$ projects, and in the opposite end a hole, $e$, is made to receive the dowel $d$ of the adjoining felly-section. These holes may be provided in both ends of the felly-section, and a pin or bolt used to connect the adjoining ends of the fellies, if desired. B is a block, having the same form as the transverse section of the felly, and is provided with a central opening, $f$, for receiving the dowel $d$. This block is placed between the ends of the felly-sections when the wheel is made, and when the spokes become worn, so that when it becomes necessary to contract the rim of the wheel, one or more of the said blocks may be removed and the rim contracted, so as to force the spokes farther into the hub when the tire is shrunk on.

The felly is designed for the wheels of ordinary vehicles of all descriptions, and it possesses the advantage of being durable and strong, while it is rendered by its peculiar construction nearly, if not quite, as light as wood.

Having thus described my invention, I claim as new and desire to secure by Letters Patent—

A vehicle-wheel whose fellies are provided with the intermediate detachable blocks B, through which pass the dowel-pins, as shown and described.

WILLIAM ALEXANDER WHARTON.

Witnesses:
JOHN H. MORTON,
JNO. C. PORTER.